Nov. 3, 1964

R. HORNE ETAL 3,155,299

RACKS FOR FISHING RODS

Filed June 15, 1961

INVENTORS
RONALD HORNE
BY JOSEPH T. REESE

ATTORNEY

United States Patent Office 3,155,299
Patented Nov. 3, 1964

3,155,299
RACKS FOR FISHING RODS
Ronald Horne, 3365 N. Federal Highway, and Joseph T. Reese, 1918 S. Andrews Ave., both of Fort Lauderdale, Fla.
Filed June 15, 1961, Ser. No. 117,411
1 Claim. (Cl. 224—42.1)

This invention relates to improvements in racks for fishing rods, and more particularly, that type of rack which is mountable on the inside of the top of the form of motor vehicle commonly designated as a "station wagon."

One of the objects of our invention is to provide a simple and effective rack, which will accommodate a number of fishing rods, and permit their being mounted in the rack in such a way that when the vehicle is under weigh the rods will be securely retained within the rack, with the elimination of noise, adding to the comfort of the passengers, and the elimination of the possibility of damage to the rods during transport, by reason of random movements of the rods which would otherwise occur.

Another object of our invention is to provide a simple, efficacious rack of fishing rods, which will permit their insertion in and retention by such rack through simple, quick and effective hand movements, the rod, after such insertion, being held securely against further random movement within the rack as when the vehicle passes over rough roadway.

A further object of our invention is to provide a rack for fishing rods which is simple of installation, and removable, if the occasion requires it, for reinstallation in another vehicle of the station wagon type.

Another object of our invention is to provide a rack for station wagons which is simple in its construction, and may be manufactured at low cost, so that it may be reasonably priced to the user.

These and other objects of the invention will be more particularly described in the following specification, and appended claims and are shown in the annexed drawings.

Figure 1:
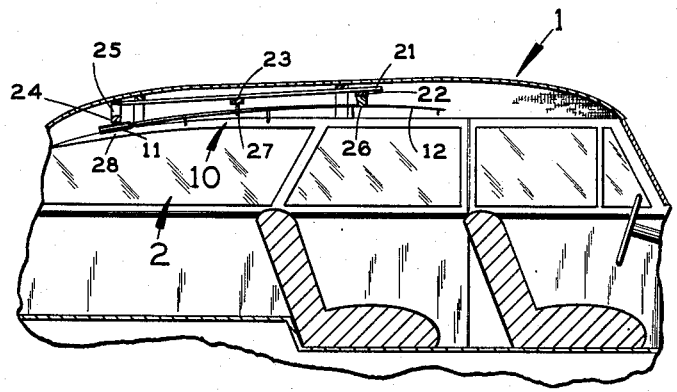
Figure 2:
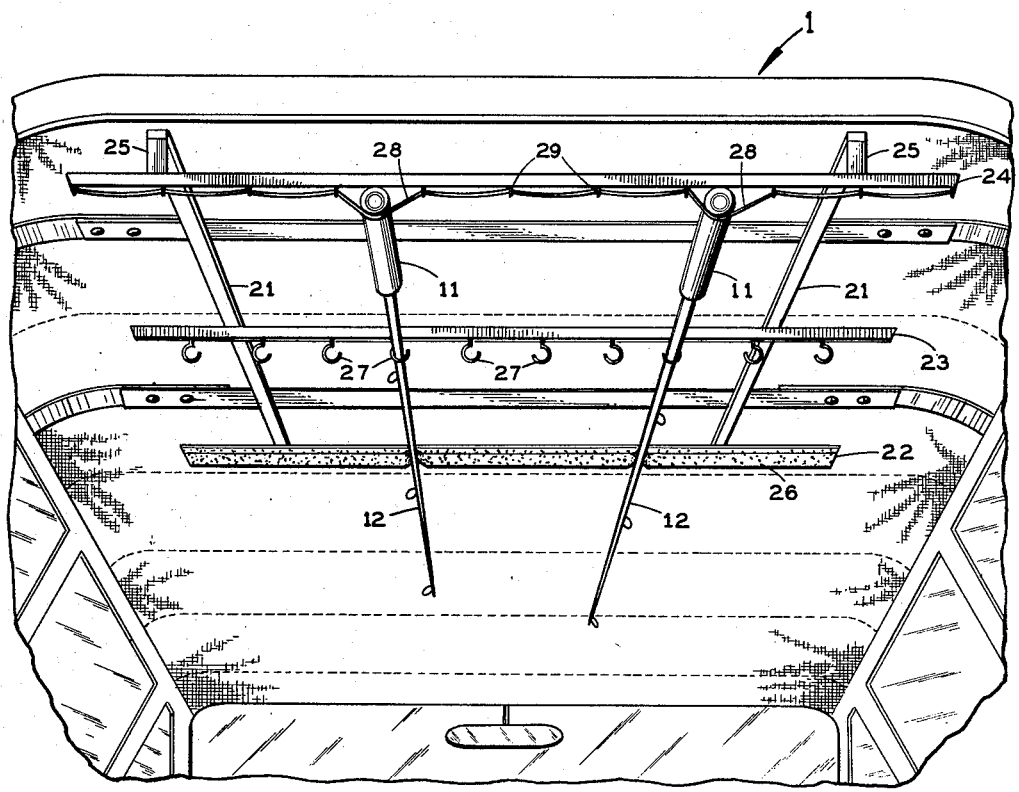

Referring now particularly to the drawings, FIG. 1 is a sectional view of the interior of a station wagon, or similar vehicle, with one of my racks, shown in section, installed;

FIG. 2 is a perspective view of the interior of a station wagon, showing the elements of our rack with two fishing rods therein disposed.

Referring now to the drawings, FIG. 1 indicates generally the top portion of a vehicle, such as a station wagon, and the numeral 2, the interior thereof, the rack being indicated generally, FIG. 1, by numeral 10.

Referring now particularly to FIG. 2, the rack consists of two base members, 21, 21, fixed by suitable means to the underside of the top of the vehicle, as by screws attached to one of the vehicle ribs, said screws not being numbered in the drawings. Disposed transversely to the base members 21 are three spaced rod supports, 22, 23 and 24, referred to in this specification, and the appended claims as a forward support, 22, an intermediary support, 23, and a rearward support, 24.

The forward support, 22, is provided with a facing, 26, of a resilient material, such as foamed rubber or plastic, the purpose of which is to provide a cushion for the rod, to hold it spaced from the forward support, 22, in such a manner that it will not be damaged in any way when it is disposed thereagainst.

On the intermediary support 23, we provide a number of indexing members for spacing the rods laterally and retaining them in an indexed position, one embodiment of which may be hooks 27, such as are shown.

On the rearward support, 24, we provide a flexible strap 28, which may be of such a material as rubber or the like, or a flexible or stretchable plastic, in which are disposed a series of pockets for the rod handles, 11, defined by retention means on the rearward support 24, such as staples, 29, as shown in FIG. 2. Each of the pockets is indexed with one of the rod indexing members 27 on the intermediary support 23, and the flexibility of the strapping material 28 is such that it will accommodate the larger radius of the rod handle, 11. The rearward support 24 is further spaced from the base members by a pair of blocks, 25, as shown in FIG. 2. The dimensional relationship of the three supports is such that the face of support 24 is farthest from the base members 21, the facing of the support 22 at an intermediary distance, and the center of the hooks on the intermediary support 23 being closer to the base members, 21. These general relationships must be maintained although they may be varied somewhat from the relationships shown and still attain the results of the invention.

Referring now to FIG. 1, it will be observed that the spacing of the three supports is such that when a rod is faced against support 22, indexed on one of the hooks, 27, of support 23, and inserted within the complementary pocket of support 24, it will be arcuately flexed between the three supporting members, so that it is firmly held in the position of its insertion, and will not rattle or move in the rack when the vehicle is subjected to bouncing or joggling by reason of an uneven road.

It will be further observed from the drawing that a rod may be inserted into the rack by moving it horizontally along the underside of the top of the vehicle, emplacing the tip-end against the resilient facing 26, indexing the rod in the nearest hook 27, on the intermediary support, and then inserting the handle within the corresponding pocket of the rearward support, 24. The location of the rod in the rack is thus readily effected, and it is then firmly retained within the rack. It will be further observed that removal of the rod may be quickly effected by the reversal of the sequence of the insertion operations.

It will be further observed that the dimensions of our rack are such that as many as ten rods may be carried at one time, while occupying a minimum of space, and without inconvenience to the passengers in the vehicle.

It should further be noted that, while we have disclosed one commercial embodiment of the invention, numerous variants are possible, the scope thereof being defined in the appended claim.

Having fully described our invention, we claim:

In a fishing rod rack for use in automotive vehicles, having relatively flat tops, as station wagons, the combination of three spaced rod supports, attached to the underside of the top of said vehicle, including a forward abutment support, having an appreciable vertical dimension below the top of said vehicle, and being faced on the lower extremity with a resilient material, an intermediary support, having a vertical dimension less than the vertical dimension of said forward support, and provided with a series of spaced hook means for engagement with mid portions of fishing rod shafts, and a rearward abutment support, having a vertical dimension greater than said intermediary support, and provided with a series of flexible means, laterally indexed in relation to said engagement hook means on said intermediary support, to engage and retain fishing rod handles against said rearward support.

References Cited in the file of this patent

UNITED STATES PATENTS

| | | |
|---|---|---|
| 1,853,261 | Dawson | Apr. 12, 1932 |
| 1,970,962 | Hinckley | Aug. 21, 1934 |
| 2,234,487 | Davis | Mar. 11, 1941 |
| 2,474,274 | O'Beill | June 28, 1949 |
| 2,855,107 | Roth | Oct. 7, 1958 |